United States Patent [19]
Leidinger et al.

[11] Patent Number: 6,131,687
[45] Date of Patent: Oct. 17, 2000

[54] PROCESS FOR ACTUATING THE STEERING CYLINDERS OF MOBILE PLANT AND STEERING SYSTEM THEREFOR

[75] Inventors: Gustav Leidinger, Friedberg; Walter Kolb, Augsburg, both of Germany

[73] Assignee: O & K Orenstein & Koppel AG, Berlin, Germany

[21] Appl. No.: 08/640,901

[22] PCT Filed: Jun. 14, 1995

[86] PCT No.: PCT/EP95/02311

§ 371 Date: Jan. 7, 1997

§ 102(e) Date: Jan. 7, 1997

[87] PCT Pub. No.: WO96/01760

PCT Pub. Date: Jan. 25, 1996

[30] Foreign Application Priority Data

Jul. 8, 1994 [DE] Germany ............................ 44 24 063
Oct. 19, 1994 [DE] Germany ............................ 44 37 301

[51] Int. Cl.[7] ................................................ B62D 5/00
[52] U.S. Cl. ................................. 180/403; 180/405
[58] Field of Search ................................ 180/403, 405, 180/406; 60/405, 452

[56] References Cited

U.S. PATENT DOCUMENTS

| | | | |
|---|---|---|---|
| 3,719,249 | 3/1973 | Becker et al. ........................... | 180/406 |
| 3,935,918 | 2/1976 | Hicks et al. ............................ | 180/406 |
| 3,952,510 | 4/1976 | Peterson ................................. | 180/406 |
| 3,958,657 | 5/1976 | McBurnett .............................. | 180/406 |
| 4,044,786 | 8/1977 | Yip ........................................ | 180/103 |
| 4,476,677 | 10/1984 | Hanshaw ................................ | 180/403 |
| 4,517,800 | 5/1985 | Karakama et al. ..................... | 180/403 |
| 4,553,389 | 11/1985 | Tischer ................................... | 180/403 |
| 4,618,017 | 10/1986 | Liebert et al. ......................... | 180/406 |
| 4,762,195 | 8/1988 | McBurnett .............................. | 180/406 |

FOREIGN PATENT DOCUMENTS

| | | |
|---|---|---|
| 0044065 | 1/1982 | European Pat. Off. . |
| 0168383 | 1/1986 | European Pat. Off. . |
| 3043365 | 7/1981 | Germany . |
| 3736423 | 5/1988 | Germany . |
| 3732662 | 4/1989 | Germany . |

OTHER PUBLICATIONS

Automotive Engineering, vol. 89, No. 9, Sep. 1981, Dallas, Texas, US; "Emergency steering: which system is the best?" pp. 46–51.

*Primary Examiner*—Daniel G. DePumpo
*Attorney, Agent, or Firm*—Venable; Robert Kinberg; Catherine M. Voorhees

[57] ABSTRACT

A steering system for mobile machines includes at least two hydraulic pumps; at least one steering gear connected to the at least two hydraulic pumps by hydraulic lines, the hydraulic lines being brought together to form a single feed line that is connected to the steering gear; at least one steering cylinder connected to the steering gear; and a return element being provided in each of the hydraulic lines connecting the respective pumps and at least one steering gear; wherein the at least two hydraulic pumps are variable displacement pumps that have pressure and feed current regulators, the regulators being adjustable to predetermined, variable load-sensing differential pressures.

17 Claims, 2 Drawing Sheets

PROCESS FOR ACTUATING THE STEERING CYLINDERS OF MOBILE PLANT AND STEERING SYSTEM THEREFOR

BACKGROUND OF THE INVENTION

The invention relates to a process for actuating the steering cylinders of mobile machines, in particular wheel loaders, graders, mobile excavators or the like.

Wheel loaders, but also other machines starting with a certain size have two separate control systems because of safety requirements as well as legal regulations. In this case, the second system, which is frequently called an emergency control system, becomes operational only if the primary system cannot meet its function as designed due to a defect or interference. Thus, the primary system must be designed such that it meets all legal and technical driving requirements, in particular also for low steering system speeds. The emergency steering system is non-functioning during this operating condition, but requires energy because of the constant transfer by pumping of its feed current. In addition, expensive emergency valves and flow-through indicators are required, which become effective when the primary system fails. Even though the emergency control system as a rule is used rarely or never and thus is not employed frequently, it can occur that this system fails rather than the main system, so that its failure must be indicated as well. Furthermore, the additional components such as emergency valves and flow-through indicator result in pressure losses, which have a negative effect on the energy balance.

SUMMARY OF THE INVENTION

It is the object of the invention to design a process for actuating the steering cylinders of mobile machines as well as the steering system of mobile machines in such a way that the previously described disadvantages for the most part are avoided, and this in particular for specific operating conditions, e.g. for low drive motor speeds.

With a process for actuating the steering cylinders of mobile machines, in particular wheel loaders, graders, mobile excavators or the like, this object is achieved by bringing together the feed currents of two hydraulic pumps either continuously or, depending on predetermined parameters, discontinuously and by supplying the resulting feed current to at least one steering gear actuating the steering cylinders, wherein if one pump fails, the feed current from the still active pump(s) is prevented from flowing back by at least one return element that is inserted into the respective pressure line for the individual pumps.

Advantageous improvements of the process according to the invention can be seen in the following description of the invention.

The object is furthermore achieved with a steering system for mobile machines, in particular for wheel loaders, graders, mobile excavators or the like by having at least two hydraulic pumps that can be operated, at least one steering gear, one or more steering cylinders as well as the pumps, the steering gear and the hydraulic lines that connect the cylinder or cylinders, wherein the individual hydraulic lines are brought together to form a joint feed line that is connected to the steering gear and wherein return elements are provided in the individual hydraulic lines.

Advantageous improvements of the steering system according to the invention will be apparent from the detailed description.

Owing to the fact that both steering systems now can work together either continuously or discontinuously, depending on predetermined operating conditions, it is possible to ensure a sufficient feed current even for a low drive engine speed.

The following advantages are achieved with the invention:

The primary steering system, especially its pump(s) can be dimensioned smaller.

Expensive additional equipment, such as valves or the like for the emergency steering system used so far, are no longer necessary.

The flow-through indicator is also no longer necessary because the failure of each of the two systems is indicated in a simple way.

When the secondary system is not in operation, its energy expenditure can be reduced.

The total steering system can be simplified considerably.

Consequently, the costs for this can also be reduced.

Depending on the respective type of machine, the most varied types of pumps can be used, for example pumps with constant feed volume, such as gear pumps or the like, and pumps with changeable, meaning controllable, feed volume. Type and selection of the pump(s) in this case depends on the type of use.

For a preferred use, the invention resorts to pumps with a feed volume that can be controlled starting with zero pressure (variable displacement pumps), which have pressure and feed current regulators of the standard design used for load-pressure independent systems (load-sensing systems). Return elements are installed in the feed lines, in particular return valves, which, in case of damage in the range of one of the pumps are designed to prevent the other pump from pumping its oil current through this pump and back into the tank. For each operating condition, at least the load-sensing differential pressure of the pump regulator exists in the feed lines, which is about 12–20 bar based on practical configurations. This pressure will actuate the pressure control devices, in particular the pressure switches, for which the switching pressure is adjusted to a value that is clearly below the load-sensing differential pressure or the so-called LS pressure. If one of the pumps fails, meaning it can no longer build up pressure, the respective switch returns to its off-position, thereby indicating optically and/or acoustically the pump failure (as stipulated by law) to the driver.

In order to achieve a controlled distribution of the proportional feed currents, the load-sensing pressures for the individual pumps should be selected differently, e.g. in the range of 2–4 bar. With this measure, it is achieved that the pump with the higher pressure adjustment delivers respectively the necessary feed current, that is the feed current requested by way of the turning speed of the steering wheel, wherein the other pump(s) is (are) then pushed back to the zero pressure position. Only if the feed pump has reached its maximum move on stroke angle and thus the highest possible feed current for the given drive speed, does the backup pump begin to move on stroke and contribute its share of the feed current. As a result of the successively occurring moving on stroke of the individual pumps, the tendency to vibrate is dampened in the total circulation, whereas such a system would have a tendency toward pressure vibrations with a simultaneous deflection of all pumps.

If legal regulations require that the backup pump(s) is operated via a component of the drive shaft line that is attached rigidly to the vehicle wheels in order to ensure the steerability of the rolling vehicle even if the drive motor fails, and if the steerability of the vehicle must be maintained even for the reverse driving, then the backup pump should be designed in accordance with another inventive concept in such a way that it can deliver its feed current when driven in both turning directions. Here too, corresponding return valves and pressure switches are provided, which correspond to the previously described design. The backup pump (s) takes in (take in) its (their) oil via a replenishing valve, assigned in each turning direction. Via this valve, the backup pump(s) is (are) supplied with oil at its (their) suction port that changes respectively with the turning direction.

BRIEF DESCRIPTION OF THE DRAWINGS

The invention is illustrated in the drawing with the aid of an exemplary embodiment and is described as follows:

Figure 1:
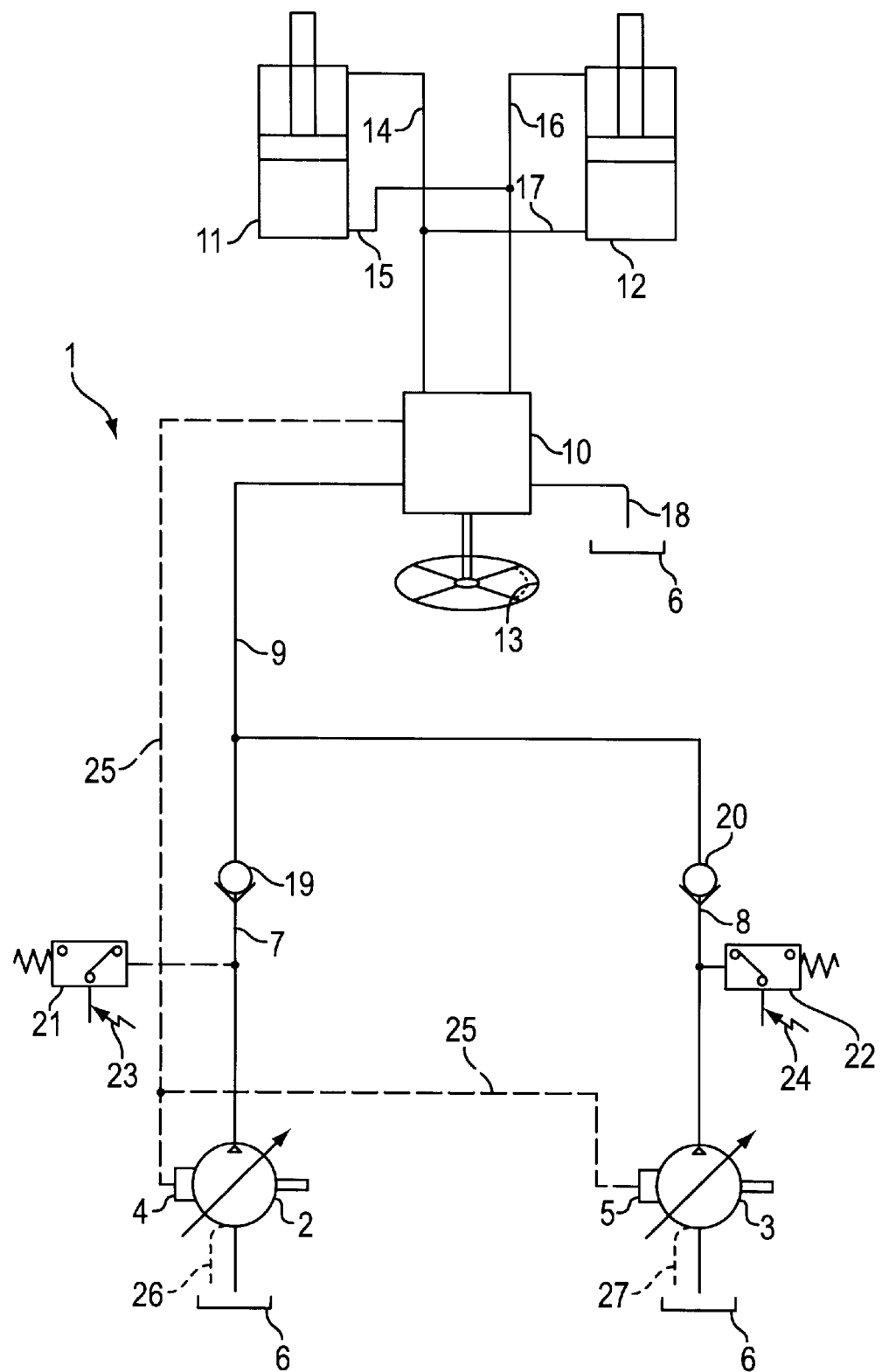
Figure 2:
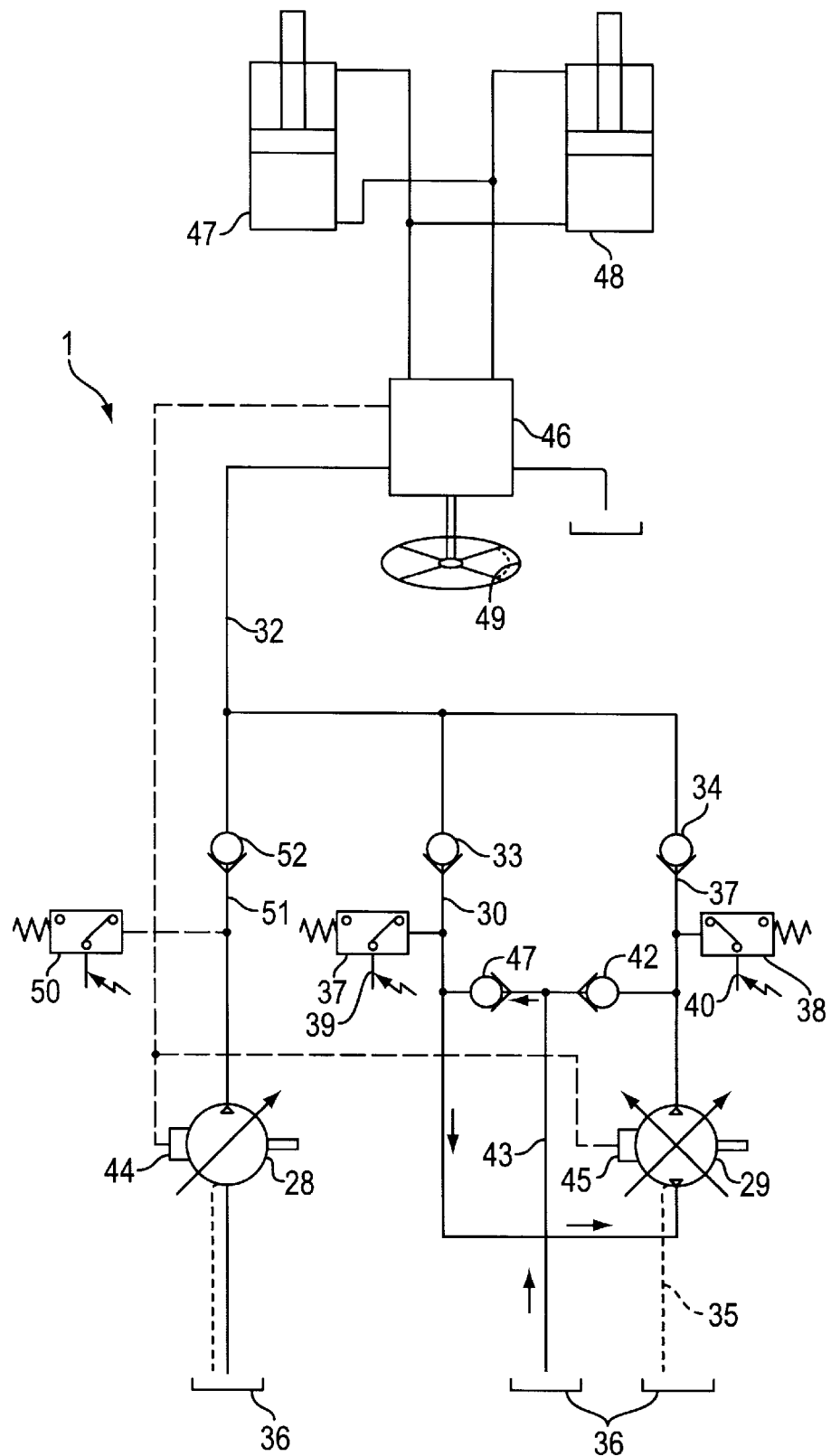

| | |
|---|---|
| FIG. 1 | Steering system with two variable displacement pumps, which are operated by a joint drive motor; |
| FIG. 2 | Steering system with two variable displacement pumps, one of which is driven via a drive shaft line component that is rigidly connected to the vehicle wheels. |

DETAILED DESCRIPTION OF THE INVENTION

FIG. 1 shows a steering system 1 that essentially comprises the following components: two pumps 2, 3 with a feed volume that can be adjusted starting from zero pressure, pumps 2, 3 having pressure and feed current regulators 4, 5 with a standard design for load-pressure independent systems (load-sensing systems). The pumps 2, 3 take in the hydraulic medium from the tank 6 and supply the hydraulic medium via the coordinated pressure lines 7, 8 to a joint feed line 9. The hydraulic medium is then made available to a commercially available steering gear 10, from which steering cylinders 11, 12 are admitted, depending on the turning direction, via lines 14, 15 or 16, 17 when the steering wheel 13 is operated. The hydraulic medium displaced during the steering operation from the cylinders 11, 12, is pumped back via line 18 to tank 6. Return valves 19, 20 are installed in the pressure or feed lines 7, 8 of the pumps 2, 3 and are designed such that in case of damage within the range of one of the pumps 2 or 3, the other pump 3 or 2 is prevented from pumping its oil flow back through it and into tank 6. For each operating condition of the steering system, at least the load-sensing differential pressure of pump regulator 4, 5 is present in the feed lines 7, 8. Based on practical configurations, the pressure is 20 bar for this example. This pressure actuates pressure switches 21, 22, which are arranged between the pumps 2, 3 and the return valves 19, 20 and for which the switching pressure is adjusted to a value that is clearly below the aforementioned load-sensing pressure.

If one of the pumps 2 or 3 fails, the respective pressure switch 21 or 22 returns to its off-position, which indicates the pump failure to the driver either optically or even acoustically via the signal lines 23, 24 that are only hinted at here. The load-sensing line 25 between steering gear 10 and the pump regulators 4, 5 here is shown with a dashed line. Also shown with dashed lines are the leakage lines 26, 27 for pumps 2 and 3, which lead to tank 6.

If the load-sensing differential pressures adjusted at the pump regulators 4 and 5 were the same, the steering gear would depend on very slight adjustment and pressure differences in the signal line 25 which each pump 2, 3 contributes to the total feed current. In order to obtain a controlled distribution, it is therefore advisable to select the load-sensing pressures differently, for example, in the range of 2–4 bar (e.g. 20 bar for the pump 2 and 16 bar for the pump 3). This achieves that the pump 2 with the higher pressure adjustment respectively delivers the necessary feed current, meaning the one requested via the turning speed of the steering wheel 13, wherein the other pump 3 is pushed back to its zero pressure position. Only after pump 2, which initially pumps by itself, has reached its maximum move on stroke angle and thus the highest possible feed current with the given input speed, does the other pump 3 start to move on stroke and contribute its share of the feed current. This successively occurring movement on stroke of the pumps 2 and 3 also dampens the tendency of vibration in the total hydraulic circulation, whereas with a simultaneous deflection of both pumps 2, 3, the systems would have a tendency of pressure vibrations.

FIG. 2 shows an alternative exemplary embodiment, which also has two variable displacement pumps 28, 29, but which are not operated as described in FIG. 1 by a joint drive motor, but by various drive elements. The variable displacement pump 29 in this embodiment is driven via a drive shaft line component that is rigidly connected to the machine wheels, which are not shown in detail here, to ensure the steerability of the rolling machine even after the drive motor for the variable displacement pump 28 has failed. In addition, the variable displacement pump 29 is capable of discharging its feed current in both turning directions during the operation, so as to maintain in this way the steerability of the machine for the reverse drive as well. Depending on the turning direction, the variable displacement pump 29 feeds either via the line 30 or the line 31 into the joint line 32 that it is also connected to the other variable displacement pump 28. Each of the lines 30 or 31 that become a feed line, depending on the driving direction and thus also the rotational direction of the pump 29, has a return valve 33, 34. The function of this return valve is the same as shown in FIG. 1, namely to prevent the pump 28 from pumping its oil directly via the leakage line 35 of pump 29 to the tank 36 if there is damage to pump 29.

Connected to each of the two lines 30, 31 is a pressure switch 37, 38, one of the pressure switches is respectively admitted with the load-sensing differential pressure, depending on the rotational direction of the pump 29. Only if pump 29 fails, meaning it can no longer generate any pressure, do both pressure switches 37 and 38 go to the off position. The pump failure is indicated to the driver either acoustically and/or optically via the signal lines 39, 40 that are only hinted at here and a corresponding switching logic. Depending on the rotational direction, the pump 29 takes in its oil via the replenishing valves 41, 42 and the feed line 43 from the tank 36. In this example, the feed current of the hydraulic medium is shown in one direction with the aid of arrows. The additional feed current from the pump 29 is delivered to the joint feed line 32.

The operation according to FIG. 2 is analogous to the operation according to FIG. 1, wherein here as well the regulator 44 has a higher load-sensing differential pressure than the regulator 45 for the pump 29. As a result of this measure, the pump 28 initially pumps by itself, until it has reached its maximum move on stroke angle and thus its largest feed current for the given drive speed. The feed current is supplied via the steering gear 46 to the following steering cylinders 47 and 48, wherein the respective lines are admitted by changing the rotational direction of the steering wheel 49. The pressure switch 50 as well as the return valve 52, which is installed in the feed line 51, here serve the same function as described in FIG. 1.

What is claimed is:

1. A steering system for mobile machines comprising:

at least two hydraulic pumps;

at least one steering gear connected to said at least two hydraulic pumps by hydraulic lines, the hydraulic lines being brought together to form a single feed line that is connected to the steering gear;

at least one steering cylinder connected to the steering gear; and a return element being provided in each of the hydraulic lines connecting the respective pumps and at least one steering gear;

wherein the at least two hydraulic pumps are variable displacement pumps that have pressure and feed current regulators, said regulators being adjustable to predetermined, variable load-sensing differential pressures.

2. A steering system according to claim 1 further comprising pressure indicators which are arranged between each respective pump and the respective return element, said pressure indicators being connected via corresponding signal lines with monitors in a control station for the machine.

3. A steering system according to claim 1 wherein one of said at least two pumps is driven by a drive shaft line component that is rigidly connected to wheels of the machine, said drive shaft line component ensures the steerability of a moving machine in both driving directions even after an associated drive motor fails and the pump connected to the drive shaft line delivers its feed current during both driving directions.

4. A steering system according to claim 1, wherein at least one pump delivers its feed current to the single feed line via a coordinated feed line, depending on the respective rotational direction of the steering gear, said coordinated feed line being one of the hydraulic lines and an additional hydraulic line.

5. A steering system according to claim 4, wherein a return element and a pressure indicator are installed in both hydraulic lines of the coordinated feed line.

6. A steering system according to claim 5, wherein said at least one pump takes in hydraulic medium via a line from a tank, the hydraulic lines of the coordinated feed line are connected to each other and further comprising replenishing valves located between said line and each hydraulic line of the coordinated feed line for both output directions.

7. A steering system according to claim 2 wherein said pressure indicators are pressure switches.

8. A steering system according to claim 2, wherein said monitors are one of an optical monitor and an acoustical monitor.

9. A steering system according to claim 5, wherein said pressure indicators are pressure switches.

10. A process for actuating steering cylinders of mobile machines in a steering system including at least two hydraulic pumps, at least one steering gear connected to said at least two hydraulic pumps by hydraulic lines, and a return element being provided in each of the hydraulic lines connecting the respective pumps and at least one steering gear, said process comprising the steps of:

bringing together feed currents of said at least two hydraulic pumps to form a resultant feed current; and supplying the resulting feed current to said at least one steering gear thereby actuating the steering cylinders, whereby if one of said at least two hydraulic pumps fails, a return flow of the feed current of the still operating pump is prevented by the return element that is inserted in the respective hydraulic line for the individual pumps.

11. A process according to claim 10, wherein pressure in the respective hydraulic lines of the individual pumps are monitored and one of an optical and an acoustical signal is triggered at the control station if the pressure drops.

12. A process according to claim 10, further comprising the step of:

adjusting the feed volume of said at least two hydraulic pumps by starting with zero pressure as measured by pressure and feed current regulators in the respective hydraulic feed lines of the individual pumps thereby applying a load-sensing differential pressure for each operating condition of the steering system.

13. A process according to claim 12, wherein a load-sensing differential pressure of 12–20 bar is applied.

14. A process according to claim 12, wherein the steering system further includes further comprising pressure sensing elements arranged between each respective pump and a respective return element, each pressure sensing element having a switching pressure and further comprising the step of:

adjusting the switching pressure of the pressure sensing elements to a value that is below the load-sensing differential pressure.

15. A process according to claim 12, wherein the load-sensing differential pressures are configured differently for the individual pumps so that one of the pumps initially delivers the feed current and only after the initial pump has reached its maximum move on stroke angle does another pump move on stroke and contribute its respective, share of the resultant feed current.

16. A process according to claim 10, wherein the step of bringing together the feed currents of said at least two hydraulic pumps is continuously executed.

17. A process according to claim 10, wherein the step of bringing together the feed currents of said at least two hydraulic pumps is discontinuously executed.

* * * * *